United States Patent [19]
Davies

[11] Patent Number: 5,949,926
[45] Date of Patent: Sep. 7, 1999

[54] MINIMUM PHASE DISPERSION COMPENSATOR

[75] Inventor: Robert J. Davies, Calgary, Canada

[73] Assignee: Telecommunications Research Laboratories, Edmonton, Canada

[21] Appl. No.: 08/990,860

[22] Filed: Dec. 15, 1997

[51] Int. Cl.[6] .................................................. G02F 1/035
[52] U.S. Cl. .............................................. 385/3; 332/145
[58] Field of Search ...................... 385/2, 3, 14; 332/145

[56] References Cited

U.S. PATENT DOCUMENTS

| | | |
|---|---|---|
| 4,485,357 | 11/1984 | Voorman .................................. 332/145 |
| 5,301,058 | 4/1994 | Olshansky . |
| 5,369,670 | 11/1994 | Zagloul et al. . |

OTHER PUBLICATIONS

Young, T., J. Conradi, W. Tinga and B. Davies, "Generation and Transmission of FM and π/4 DQPSK Signals at Microwave Frequencies Using Harmonic Generation and Optoelectronic Mixing in Mach–Zehnder Modulators," *IOOC 95*, pp. 72–73 (Jun. 1995).

Young, T., J. Conradi and W. Tinga, "Generation and Transmission of FM and π/4 DQPSK Signals at Microwave Frequencies Using Harmonic Generation and Optoelectronic Mixing in Mach–Zehnder Modulators," *IEEE Transactions on Microwave Theory and Techniques*, 44:446–453 (Mar. 1996).

Koyama, F. and K. Iga, "Frequency Chirping in External Modulators," *Journal of Lightwave Technology*, 6(1):87–93 (Jan. 1988).

Djupsjöbacka, A. and O. Sahlén, "Dispersion Compensation by Differential Time Delay," *IEEE Journal of Lightwave Technology*, 12(10):1849–1853 (Oct. 1994).

Jopson, R.M., A.H. Gnauck and R.M. Derosier, "10 Gb/s 360–km Transmission Over Normal–Dispersion Fiber Using Mid–system Spectral Inversion," *Proceedings OFC '93*, paper PD3–1 (1993) No Month.

Gnauck, A.H., S.K. Korotky, J.J. Veselka, J. Nagel, C.T. Kemmerer, W.J. Minford, and D.T. Moser, "Dispersion Penalty Reduction Using an Optical Modulator with Adjustable Chirp," *IEEE Photonics Technology Letters*, 3(10):916–918 (Oct. 1991).

Iwashita, K. and N. Takachio, "Chromatic Dispersion Compensation in Coherent Optical Communications," *Journal of Lightwave Technology*, 8(3):367–375 (Mar. 1990).

Winters, J.H., "Equalization in Coherent Lightwave Systems Using Microwave Waveguides," *Journal of Lightwave Technology*, 7(5):813–815 (May 1989).

(List continued on next page.)

*Primary Examiner*—Rodney Bovernick
*Assistant Examiner*—Robert E. Wise
*Attorney, Agent, or Firm*—Christensen O'Connor Johnson & Kindness PLLC

[57] ABSTRACT

An apparatus for implementing post-detection dispersion compensation on a minimum-phase optical single sideband signal propagating along an optical fiber, in which the optical fiber induces phase distortion on the minimum-phase optical single sideband signal. The apparatus comprises a first envelope detector adapted to be coupled with the optical fiber and having as output an envelope signal representing the envelope of the minimum-phase optical single sideband signal, a phase synthesizer connected to the output of the first envelope detector for generating a phase signal representing the phase of the minimum-phase optical single sideband signal, a combiner having as input the envelope signal and the phase signal and having as output a complex signal whose phase is obtained from the phase signal and whose amplitude is obtained from the envelope signal, a complex antidispersive filter connected to receive the complex signal and configured to remove optical fiber induced phase distortion from the complex signal to produce a filtered output; and a second envelope detector connected to the complex antidispersive filter to recover an information signal from the filtered output. A corresponding method of post-detection dispersion compensations is also disclosed.

9 Claims, 1 Drawing Sheet

OTHER PUBLICATIONS

Winters, J.H., "Equalization in Coherent Lightwave Systems Using a Fractionally Spaced Equalizer," *Journal of Lightwave Technology,* 8(10):1487–1491 (Oct. 1990).

Yonenaga, K., S. Kuwano, S. Norimatsu and N. Shibata, "Optical duobinary transmission system with no receiver sensitivity degradation," *Electronic Letters,* 31(4):302–304 (Feb. 1995).

May, G., A. Solheim and J. Conradi, "Extended 10 Gb/s Fiber Transmission Distance at 1538 nm Using a Duobinary Receiver," *IEEE Photonics Technology Letters,* 6(5):648–650 (May 1994).

Izutsu, M., S. Shikama and T. Sueta, "Integrated Optical SSB Modulator/Frequency Shifter," *IEEE Journal of Quantum Electronics,* QE–17(11):2225–2227 (Nov. 1981).

Yonenaga, K. and N. Takachio, "A Fiber Chromatic Dispersion Compensation Technique with an Optical SSB Transmission in Optical Homodyne Detection Systems," *IEEE Photonics Technology Letters* 5(8):949–951 (Aug. 1993).

Yonenaga, K. and S. Norimatsu, "Dispersion Compensation for Homodyne Detection Systems Using a 10 Gb/s Optical PSK–VSB Signal," *IEEE Photonics Technology Letters* 7(8):929–931 (Aug. 1995).

Haykin, S., *Communication Systems,* 2nd Edition, J. Wiley and Sons, Inc., New York, 1983, problems 171 & 172 No Month.

Weaver, D.K., Jr., "A Third Method of Generation and Detection of Single–Sideband Signals," *Proceedings of the IRE* 44:1703–1705 (1956) No Month.

Villard, O., "Composite Amplitude and Phase Modulation," *Electronics,* Nov. 1948, pp. 86–89.

MINIMUM PHASE DISPERSION COMPENSATOR

FIELD OF THE INVENTION

This invention relates to fiber optic communication systems.

BACKGROUND OF THE INVENTION

Optical fiber transmission systems are subject to distortion related to loss, noise, and nonlinearities in both the fiber and the modulation and amplification devices. One of the more deleterious forms of nonlinear distortion is that due to chromatic dispersion. Chromatic dispersion in optical fiber is typically characterized by a linear (non-flat) group delay parameter. The group refractive index of the fiber at optical frequencies near a given optical carrier frequency varies approximately linearly with wavelength or optical frequency about the carrier. This finite linear group delay imposes a quadratic phase rotation across the signal frequency band.

Approaches currently used to reduce the effects of chromatic dispersion include: (1) reversing the effects of chromatic dispersion in the optical domain, (2) reversing the effects in the electrical domain after optical detection and (3) reducing the transmission bandwidth of the optical signal on the fiber. The first is based on purely optical methods where the effects of group velocity dispersion are reversed while the signal is still in the optical domain. Adding dispersion compensating fiber in the transmission path is one common approach. Other optical methods include compensation by differential time delay of the upper and lower sidebands of the modulated signal, see A. Djupsjobacka, O. Sahlen, "Dispersion compensation by differential time delay," IEEE Journal of Lightwave Technology, vol. 12, no. 10, pp. 1849–1853, October 1994; spectrally inverting the signal at the midpoint of the transmission path, see R. M. Jopson, A. H. Gnauck, R. M. Derosier, "10 Gb/s 360-km transmission over normal-dispersion fiber using mid-system spectral inversion," Proceedings OFC'93, paper PD3, 1993; and pre-chirping the transmitted signal in an external modulator, see F. Koyama, K. Iga, "Frequency chirping in external modulators," IEEE Journal of Lightwave Technology, vol. 6, no. 1, pp. 87–03, January 1988 and A. H. Gnauck, S. K. Korotky, J. J. Veselka, J. Nagel, C. T. Kemmerer, W. J. Minford, D. T. Moser, "Dispersion penalty reduction using an optical modulator with adjustable chirp," IEEE Photonics Technology Letters, vol. 3, no. 10, pp. 916–918, October 1991.

The second approach, in which dispersion effects are reversed in the electrical domain, is based on coherent transmission and heterodyne detection followed by equalization in the electrical domain. Homodyne detection is only effective on single sideband signals. If homodyne detection were attempted with a DSB signal, the upper and lower sidebands would overlap upon detection and the phase information would be lost and the higher modulation frequencies severely attenuated or distorted through partial or complete cancellation of various sideband frequencies. Some techniques used or proposed for post-detection equalization include microstrip lines, see K. Iwashita, N. Takachio, "Chromatic dispersion compensation in coherent optical communications," Journal of Lightwave Technology, vol. 8, no. 3, pp. 367–375, March 1990; microwave waveguides, see J. H. Winters, "Equalization in coherent lightwave systems using microwave waveguides," Journal of Lightwave Technology, vol. 7, no. 5, pp. 813–815, May 1989, and fractionally spaced equalizers, see J. H. Winters, "Equalization in coherent lightwave systems using a fractionally spaced equalizer," Journal of Lightwave Technology, vol. 8, no. 10, pp. 1487–1491, October 1990.

The third approach is to modify the transmission format where the baseband signal spectrum is compressed. These types of approaches, which reduce the transmission bandwidth required on the fiber to transmit a given bit rate, are generally implemented by modifying the line code format in order to reduce the effective bandwidth required to transmit or receive the data, see K. Yonenaga, S. Kuwano, S. Norimatsu, N. Shibata, "Optical duobinary transmission system with no receiver sensitivity degradation," Electronic Letters, vol. 31, no. 4, pp. 302–304, February 1995, and G. May, A. Solheim, J. Conradi, "Extended 10 Gb/s fiber transmission distance at 1538 nm using a duobinary receiver," IEEE Photonics Technology Letters, vol. 6, no. 5, pp. 648–650, May 1994.

More recently it has been shown that optical single sideband transmission (OSSB) can combat some of the deleterious effect of chromatic dispersion. OSSB provides a dispersion benefit directly by reducing the signal bandwidth and also by augmenting post-detection dispersion compensation. The generation, transmission and detection of single sideband (SSB) signals has been used for both baseband and the RF and microwave regions of the electromagnetic spectrum to reduce the bandwidth of the signal by a factor of two, by sending either the upper or the lower sideband. Generation and transmission of OSSB optical signals using a Mach-Zehnder modulator is shown in M. Izutsu, S. Shikama, T. Sueta, "Integrated optical SSB modulator/frequency shifter," IEEE Journal of Quantum Electronics, vol. QE-17, no. 11, pp. 2225–2227, November 1981 and R. Olshansky, "Single sideband optical modulator for lightwave systems," U.S. Pat. No. 5,301,058, 1994. Methods based on AM compatible radio modulators were outlined in Jan Conradi, Bob Davies, Mike Sieben, David Dodds and Sheldon Walklin, "Optical Single Sideband (OSSB) Transmission for Dispersion Avoidance and Electrical Dispersion Compensation in Microwave Subcarrier and Baseband Digital Systems", OFC 97 Postdeadline, February 1997, and M. Sieben, J. Conradi, D. Dodds, B. Davies, and S. Walklin "10 Gbit/s optical single sideband system" Electronics Letters Vol. 33, No. 11, pp. 971–973. These structures overcame the need for large added carrier in the transmitted optical signal by using approximations to time domain minimum phase signals with single sideband properties. This allowed the transmitted information to be directly modulated onto the optical electric field envelope while a special phase function was incorporated into the AM signal to cancel half of the transmitted information spectrum.

While in baseband SSB optical modulation a dispersion benefit accrues directly due to the fact that the transmitted signal spectrum has been reduced by a factor of two, the more significant advantage of optical SSB transmission is that the fiber dispersion can be compensated in the electrical domain after detection. This advantage is similar to that for heterodyne detection of DSB signals, but with SSB transmission and detection, the signal can be homodyned directly to baseband using carrier signal added either at the source or at the receiver and thus it can be directly detected with the phase or delay information of the transmitted signal preserved. This was shown in K. Yonenaga, N. Takachio, "A Fiber chromatic dispersion compensation technique with an optical SSB transmission in optical homodyne detection systems," IEEE Photonics Technology Letters, vol. 5, no. 8, pp. 949–951, August 1993, where integrated optical structures were used to generate single sideband tones for narrowband applications. In K. Yonenaga, No. Takachio, "Dispersion compensation for homodyne detection systems using a 10 Gb/s optical PSK-VSB signal," IEEE Photonics Technology Letters, vol. 7, no. 8, pp. 929–931, August 1995, a single sideband optical modulator was described for the purpose of transmitting two or more optical signals with different optical carrier frequencies on a single fiber. The purpose of transmitting the signals in a single sideband format is to permit these optical carrier frequencies to be spaced as closely as possible to the maximum modulation frequency. A fundamental disadvantage of this type of dispersion compensation is found in the fact that the carrier power added to the transmitted signal must be significant thus reducing the potential signal to noise ratio at the transmitter.

SUMMARY OF THE INVENTION

A form of post detection compensation for minimum phase single sideband optical signals that is believed to be more precise is to exploit the fact that the received optical SSB signal maintains some of its minimum phase properties even after it has been badly distorted by fiber dispersion. The technique is believed to be generally applicable to other forms of transmission of single sideband signals and other transmission media including by means of cable, radio and twisted pair.

Thus there is proposed a new dispersion compensation method that works in conjunction with minimum phase SSB modulation. A complex signal is synthesized from the post detection envelope of the received signal. Once this complex minimum phase signal is recovered, antidispersive filters may be used to remove the fiber dispersion. This method offers an improvement over self homodyne schemes in that the signal to noise ratio is not limited by the requirement for significant carrier power in the received signal.

There is therefore provided in accordance with an aspect of the invention, an apparatus for implementing post-detection dispersion compensation on a minimum-phase single sideband signal propagating through a transmission medium, in which the transmission medium induces phase distortion on the minimum-phase single sideband signal. The apparatus comprises a first envelope detector adapted to be coupled with the transmission medium and having as output an envelope signal representing the envelope of the minimum-phase single sideband signal, a phase synthesizer connected to the output of the first envelope detector for generating a phase signal representing the phase of the minimum-phase single sideband signal, a combiner having as input the envelope signal and the phase signal and having as output a complex signal whose phase is obtained from the phase signal and whose amplitude is obtained from the envelope signal, a complex antidispersive filter connected to receive the complex signal and configured to remove transmission medium induced phase distortion from the complex signal to produce a filtered output; and a second envelope detector connected to the complex antidispersive filter to recover an information signal from the filtered output.

The invention has particular utility for application to minimum phase optical single sideband signals propagating through an optical fiber as the transmission medium.

In a further aspect of the invention, the first envelope detector comprises an optical photodetector that serves as a power law detector in cascade with an envelope scaling device whose output is a scaled envelope signal that is proportional to the square root of the optical photodetector output.

In a further aspect of the invention, the phase synthesizer comprises a device that operates on the scaled envelope signal so as to produce the natural log of the scaled envelope signal in cascade with a device that operates on the natural log of the scaled envelope signal so as to produce the Hilbert Transform of the natural log of the scaled envelope signal.

In a further aspect of the invention, the combiner produces a complex signal whose phase is the Hilbert transform of the natural log of the scaled envelope of the minimum-phase single sideband signal and whose amplitude is the envelope of the minimum-phase single sideband signal.

In a further aspect of the invention, there is provided a method of implementing post-detection dispersion compensation on a minimum-phase single sideband signal propagating through a transmission medium, in which the transmission medium induces phase distortion on the minimum-phase single sideband signal. The method comprises producing an envelope signal representing the envelope of the minimum-phase single sideband signal, synthesizing, from the envelope signal, a phase signal representing the phase of the minimum-phase single sideband signal, combining the envelope signal and the phase signal to produce a complex signal whose phase is obtained from the phase signal and whose amplitude is obtained from the envelope signal, filtering the complex signal to remove transmission medium induced phase distortion from the complex signal and produce a filtered output; and recovering an information signal from the filtered output.

In a further aspect of the method of the invention, the phase signal is synthesized from the phase signal by producing the natural logarithm of the envelope signal and applying a Hilbert transform to the natural logarithm of the envelope signal.

In a further aspect of the method of the invention, combining the phase signal and the envelope signal comprises producing a complex signal whose phase is the Hilbert transform of the natural log of the scaled envelope of the minimum-phase single sideband signal and whose amplitude is the envelope of the minimum-phase single sideband signal.

These and other aspects of the invention are described and claimed in the description and claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

Figure 1:
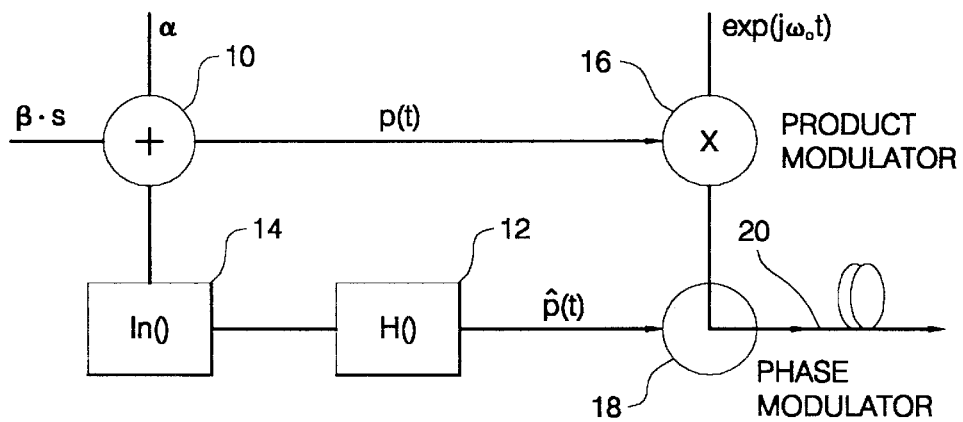
FIG. 1 is a schematic of a minimum phase modulator that may be used to generate minimum phase single sideband signals for use in an optical transmission system according to the invention.

In a preferred embodiment, the present dispersion compensation system relies on a method of generating Single Sideband bandpass signals via Hybrid Amplitude and Phase Modulation; see Gordon B. Lockhart, "A Spectral Theory for Hybrid Modulation", IEEE Transactions on Communications, Vol. COM 21, No. 7, July 1973. The essential theory is that an analytic signal may be decomposed into a phase modulation component and an amplitude modulation component. The advantage for the present application is that amplitude modulation is readily amenable to direct detection while phase modulation with the argument of the analytic signal associated with the information signal or the Hilbert Transform of the information signal may be used to remove the upper or lower sideband in the transmitted signal.

Central to the theory of single sideband signals is the analytic signal. The characteristic of analytic signals that is crucial to SSB modulation is that analytic signals have no negative frequencies. The generation of analytic signals requires the synthesis of Hilbert Transform pairs. Let a(t) be a complex bandlimited analytic signal defined by $$A(t)=s(t)+j\hat{s}(t) \qquad (1)$$

where s(t) is a real baseband or subcarrier information signal,
and $\hat{s}(t)$ is the Hilbert Transform of s(t) defined by $$\hat{s}(t) = \frac{j}{\pi}\int_{-\infty}^{\infty}\frac{s(t')}{t-t'}dt' \qquad (2)$$

Let q(t) be a bandpass signal defined by $$q(t)=A(t)\cdot\exp(j\omega_o t) \qquad (3)$$

It is obvious that if A(t) is analytic with no negative frequencies then q(t) is a single sideband signal. Now let A(t) be represented in polar form by $$A(t)=|A(t)|\exp(j\arg(A(t))) \qquad (4)$$

Equation (3) now becomes $$q(t)=|A(t)|\cdot\exp(j\arg(A(t)))\cdot\exp(j\omega_o t) \qquad (5)$$

which is a combination of amplitude and phase modulation imposed on the complex carrier.

For direct detection optical systems the modulating signal in (5) using the information signal defined as in (1) is unsuitable since the optical carrier must be recovered to extract the information signal. This situation is partially rectified by adding carrier to the modulated signal which, through square law detection, will allow recovery of a distorted information signal. The deficiency may be eliminated however by ensuring that the modulating signal is single sideband but also minimum phase in the time domain.

Minimum Phase Modulator Implementation

An exemplary implementation of a minimum phase optical modulator is shown in FIG. 1. The term minimum phase is used due to the fact that the signal (or at least a significant portion of the signal) has a fixed relationship between the amplitude and phase. This relationship is enforced upon the signal during the signal synthesis. As shown the information signal 's(t)' is scaled and then DC offset is added in adder 10 to ensure that the information signal is positive. This yields the signal $$p(t)=\alpha+\beta\cdot s(t) \qquad (6)$$

where α is a constant offset and β is a constant scaling factor set so that p(t) is positive.
Now we take the Hilbert Transform at 12 of the natural log (ln) of p(t) which is produced at 14. Both of these operations are well known in themselves and may be performed in specially designed circuits. This yields:

$$\hat{p}(t)=H[\ln(p(t))] \qquad (7)$$

At this point p(t) and $\hat{p}(t)$ are combined and modulated onto the optical carrier $\exp(j\omega_o t)$ through cascaded amplitude modulator 16 and phase modulator 18 which yields the Minimum Phase signal $$a(t)=p(t)\exp(j\hat{p}(t)) \qquad (8)$$

which is transmitted along optical fiber 20.

There is a fixed relationship between the amplitude and phase of (8). Additionally a(t) is still analytic and as such has no negative frequencies.

A complex signal composed in the above manner may be directly modulated onto the optical carrier $\exp(j\omega_o t)$ to create a single sideband signal in a variety of optical modulator structures such as 1. A laser diode intensity modulator in cascade with a external phase modulator.
2. An external amplitude modulator in cascade with a external phase modulator.
3. A Laser diode modulator configured for FM operation in cascade with an external amplitude modulator.

Additionally it has been shown that approximations may be made in the signal synthesis that maintain significant spectral cancellation while reducing the complexity of the signal conditioner. One of these approximations is to combine the signal as in the development in equations 1 to 5 but to eliminate the step where the logarithm is taken, that is:

$$\hat{p}(t)=\alpha\cdot H(p(t)) \qquad (9)$$

$\hat{p}(t)$ is combined with the envelope signal as in (8) and the resulting signal shows reduction in the required sideband. The modulator structure is reduced in complexity with the trade-off that the SSB signal emitted therefrom is non-ideal.

Minimum Phase Dispersion Compensation

Once the signal is modulated onto the optical fiber it is minimum time phase and as such has a specific relationship between amplitude and phase. The dispersive part of the fiber dispersion transfer function referred to baseband is typically given by $$\Delta(f) = \exp\left(\frac{j\pi D\lambda^2 f^2 L}{c}\right) \qquad (10)$$

where D is the dispersion parameter in ps/nm·km; λ is the optical wavelength in nm; f is the signal fundamental frequency offset from the ideal optical carrier; L is the fiber length and c is the speed of light in a vacuum.

Since the fiber distortion function in (10) only affects the phase of the frequency domain optical electric field, the envelope of the Fourier domain signal is unchanged. Since the frequency domain characteristic that corresponds to the minimum time phase characteristics is delay or how densely clustered the frequency domain signal is around the origin, the fact that the fiber dispersion has no effect on the spectral envelope indicates that the time domain minimum phase properties are preserved.

This being the case, an accurate electric representation of the entire optical complex electric field may be recovered after detection if the correct operations are performed on the detected signal. This allows dispersion compensation to be implemented on the post detection electrical signal as though it were done on the optical signal.

Figure 2:
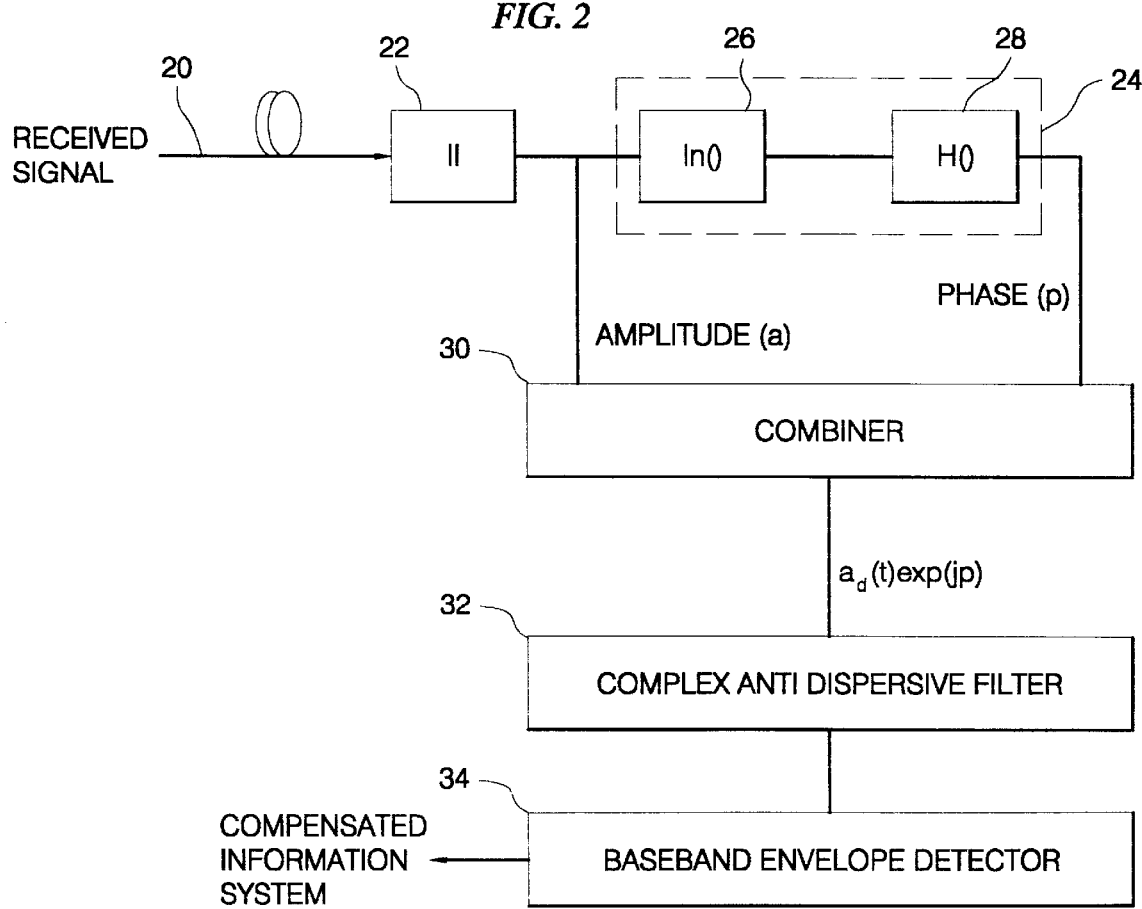
FIG. 2 is a schematic showing a minimum phase dispersion compensator according to the invention.

A block diagram of the minimum phase dispersion compensator is shown in FIG. 2. In this description, the signal is described in polar form since the apparatus operates on the polar representation of the optical electric field. An envelope detector 22 is coupled with the optical fiber 20. The output of the envelope detector 22 is an envelope signal representing the envelope of the minimum-phase optical single sideband signal carried by the optical fiber 20. The envelope detector 22 may comprise an optical photodetector that serves as a power law detector in cascade with an envelope scaling device whose output is a scaled envelope signal that is proportional to the square root of the optical photodetector output. Such devices are well known in the art in themselves and may be implemented using specifically designed hardware or programmed general purpose hardware. After square law detection in the receive photodiode, the square root of the optical power envelope is recovered to produce the scaled envelope signal. If the optical electric field on the fiber 20 is given by $$\exp(j\omega_{oi})\cdot a_d(t)\exp[j\cdot\arg(a_d(t))] \qquad (11)$$

then the signal output from the square root scaling device is given by $\alpha\cdot|a_d(t)|$ This square root representation should be proportional to the envelope of the electric field at the receive end of the fiber 20. Since the envelope of the electric field has maintained some portion of its minimum phase properties after propagating down the dispersive line, the phase of the electric field may be synthesized in a phase synthesizer 24 connected to the output of the envelope detector 22. The phase synthesizer 24 generates a phase signal representing the phase of the minimum-phase optical single sideband signal. This may be accomplished by taking the Hilbert Transform of the log of the envelope recovered by the envelope detector 22. First, the signal from the envelope detector is passed to a device 26 that operates on the scaled envelope signal so as to produce the natural log of the scaled envelope signal, and this is in turn passed to a device 28, in cascade with device 26, that operates on the natural log of the scaled envelope signal so as to produce the Hilbert Transform of the natural log of the scaled envelope signal. Equivalent methods for generating an approximation of the phase from the scaled envelope signal may be used. The transformed envelope signal output from the device 26 is an approximation to the phase of the electric field and may now be combined with the envelope function as the argument of the recovered electric field function. Thus, the amplitude signal from the envelope detector 22 and the phase signal are combined in combiner 30 to produce a complex signal whose phase is obtained from the phase signal and whose amplitude is obtained from the envelope signal. In a preferred embodiment, the output from the combiner is given by $$a_d(t)\exp(jp) \qquad (12)$$

Once the polar representation of the optical electric field is recovered it may be passed through an antidispersive filter 32 to recover the original information signal. The antidispersive filter 32 is the inverse of the fiber induced phase function centered at DC rather than the optical carrier frequency. The signal that is extracted from the optical electric field envelope in (12) is also single sideband and so the antidispersive filter 32 may also be single sided. The filter transfer function is given by $$\Delta(f) = \exp\left(\frac{-j\pi D\lambda^2 f^2 L}{c}\right)$$

where all parameters except 'f' are same as the fiber transfer function. The frequency offset in this case is from DC rather than from the optical carrier. This filter may be implemented in microstrip technology or as a tapped delay line.

The output from the antidispersive filter is an accurate representation of the complex minimum phase signal that was launched onto the fiber 20 at the transmitter (FIG. 1). The original information may be recovered from the envelope of the antidispersive filter output using an envelope detector 34 connected to the complex antidispersive filter.

A person skilled in the art could make immaterial modifications to the invention described in this patent document without departing from the essence of the invention that is intended to be covered by the scope of the claims that follow.

The embodiments of the invention in which an exclusive property or privilege is claimed are defined as follows:

1. Apparatus for implementing post-detection dispersion compensation on a minimum-phase single sideband signal propagating through a transmission medium, in which the transmission medium induces phase distortion on the minimum-phase single sideband signal, the apparatus comprising:
   a first envelope detector adapted to be coupled with the transmission medium and having as output an envelope signal representing the envelope of the minimum-phase single sideband signal;
   a phase synthesizer connected to the output of the first envelope detector for generating a phase signal representing the phase of the minimum-phase single sideband signal;
   a combiner having as input the envelope signal and the phase signal and having as output a complex signal whose phase is obtained from the phase signal and whose amplitude is obtained from the envelope signal;
   a complex antidispersive filter connected to receive the complex signal and configured to remove transmission medium induced phase distortion from the complex signal to produce a filtered output; and
   a second envelope detector connected to the complex antidispersive filter to recover an information signal from the filtered output.

2. The apparatus of claim 1 in which the transmission medium is an optical fiber, and the minimum phase single sideband signals are minimum phase single sideband optical signals.

3. The apparatus of claim 2 in which the first envelope detector comprises:
   an optical photodetector that serves as a power law detector in cascade with an envelope scaling device whose output is a scaled envelope signal that is proportional to the square root of the optical photodetector output.

4. The apparatus of claim 3 in which the phase synthesizer comprises:
   a device that operates on the scaled envelope signal so as to produce the natural log of the scaled envelope signal in cascade with a device that operates on the natural log of the scaled envelope signal so as to produce the Hilbert Transform of the natural log of the scaled envelope signal.

5. The apparatus of claim 4 in which the combiner produces a complex signal whose phase is the Hilbert transform of the natural log of the scaled envelope of the minimum-phase optical single sideband signal and whose amplitude is the envelope of the minimum-phase optical single sideband signal.

6. A method of implementing post-detection dispersion compensation on a minimum-phase single sideband signal propagating through a transmission medium, in which the transmission medium induces phase distortion on the minimum-phase single sideband signal, the method comprising:

producing an envelope signal representing the envelope of the minimum-phase single sideband signal;

synthesizing, from the envelope signal, a phase signal representing the phase of the minimum-phase single sideband signal;

combining the envelope signal and the phase signal to produce a complex signal whose phase is obtained from the phase signal and whose amplitude is obtained from the envelope signal;

filtering the complex signal to remove transmission medium induced phase distortion from the complex signal and produce a filtered output; and recovering an information signal from the filtered output.

7. The method of claim 6 in which the transmission medium is an optical fiber, and the minimum phase single sideband signals are minimum phase single sideband optical signals.

8. The method of claim 7 in which the phase signal is synthesized from the phase signal by producing the natural logarithm of the envelope signal and applying a Hilbert transform to the natural logarithm of the envelope signal.

9. The method of claim 8 in which combining the phase signal and the envelope signal comprises producing a complex signal whose phase is the Hilbert transform of the natural log of the scaled envelope of the minimum-phase optical single sideband signal and whose amplitude is the envelope of the minimum-phase optical single sideband signal.

* * * * *

UNITED STATES PATENT AND TRADEMARK OFFICE
CERTIFICATE OF CORRECTION

PATENT NO. : 5,949,926
DATED : September 7, 1999        Page 1 of 2
INVENTOR(S) : R.J. Davies It is certified that error appears in the above-identified patent and that said Letters Patent is hereby corrected as shown below:

| COLUMN | LINE | |
|---|---|---|
| Page 2, col. 2 | After Other Publ. No. 16 | following the final Other Publication, insert: |

--Powers, K.H., "The Compatibility Problem in Single-Sideband Transmission," *Proceedings of the IRE*, pp. 1431-1435 (1960).

Lockhart, G.B., "A Spectral Theory for Hybrid Modulation," *IEEE Transactions on Communications* COM 21(7):790-800 (July 1973).

Hakki, B.W., "Dispersion of Microwave-Modulated Optical Signals," *Journal of Lightwave Technology* 11(3):474-480 (March 1993).

Zaid, M.A., Lockhart, G.B., "Envelope Detection and Correction of SSB," *Electronics Letters* 20(22):901-902 (October 1984).

UNITED STATES PATENT AND TRADEMARK OFFICE
CERTIFICATE OF CORRECTION

PATENT NO. : 5,949,926
DATED : September 7, 1999
INVENTOR(S) : R.J. Davies

Page 2 of 2

It is certified that error appears in the above-identified patent and that said Letters Patent is hereby corrected as shown below:

COLUMN     LINE

(continued)     Poletti, M.A., Vaughan, R.G., "Reduction of Multipath Fading Effects in Single Variable Modulations," ISSPA 90:672-676 (August 1990).--

Signed and Sealed this

Ninth Day of January, 2001

Attest:

Q. TODD DICKINSON

Attesting Officer    Commissioner of Patents and Trademarks